United States Patent [19]

Snyder, Jr.

[11] 4,322,848

[45] Mar. 30, 1982

[54] RELIABILITY-WEIGHTED ANALOG THRESHOLD DECODER

[75] Inventor: John S. Snyder, Jr., Monrovia, Md.

[73] Assignee: Communications Satellite Corporation, Washington, D.C.

[21] Appl. No.: 163,250

[22] Filed: Jun. 26, 1980

[51] Int. Cl.³ .............................................. G06F 11/10
[52] U.S. Cl. ......................................... 371/43; 371/37
[58] Field of Search ....................... 371/43, 44, 45, 37, 371/39, 40

[56] References Cited

U.S. PATENT DOCUMENTS

| | | |
|---|---|---|
| 3,789,360 | 1/1974 | Clark, Jr. et al. ...................... 371/43 |
| 4,015,238 | 3/1977 | Davis ..................................... 371/43 |
| 4,087,787 | 5/1978 | Acampora ............................. 371/43 |
| 4,130,818 | 12/1978 | Snyder, Jr. ............................. 371/43 |

OTHER PUBLICATIONS

L. D. Rudolph, Generalized Threshold Decoding of Convolutional Codes, IEEE Transaction on Information Theory, vol. IT-16, No. 6, Nov. 1970, pp. 739-745.
W. W. Wu, New Convolutional Codes, Part II, IEEE Transactions on Communications, vol. Comp24, No. 1, Jan. 1976, pp. 19-32.

*Primary Examiner*—Charles E. Atkinson
*Attorney, Agent, or Firm*—Sughrue, Mion, Zinn, Macpeak and Seas

[57] ABSTRACT

Reliability weighting is provided in the input and/or feedback paths of an analog threshold decoder to achieve additional coding gain. Examples of the reliability weighting function for a bipolar signalling system ($\pm A$ volts), a receive voltage v and Gaussian noise having a variance $\sigma^2$ are $R=\tanh (vA/\sigma^2)$, $R=\tanh (1.6 \, v/A)$, and a linear transformation having voltage clamps at $\pm 1$ volt. In the latter case, the gain of the linear transformation in the feedback weighting function may be n times that of the input weighting function, where n is the number of estimates involves in the output.

14 Claims, 7 Drawing Figures

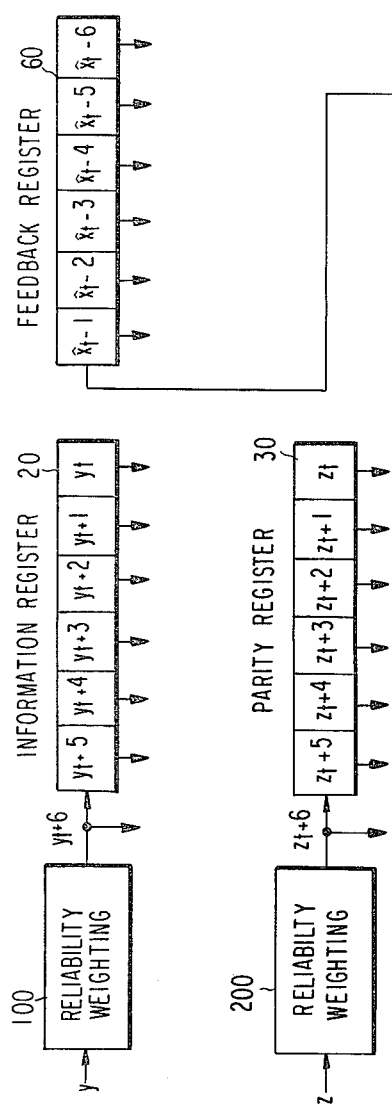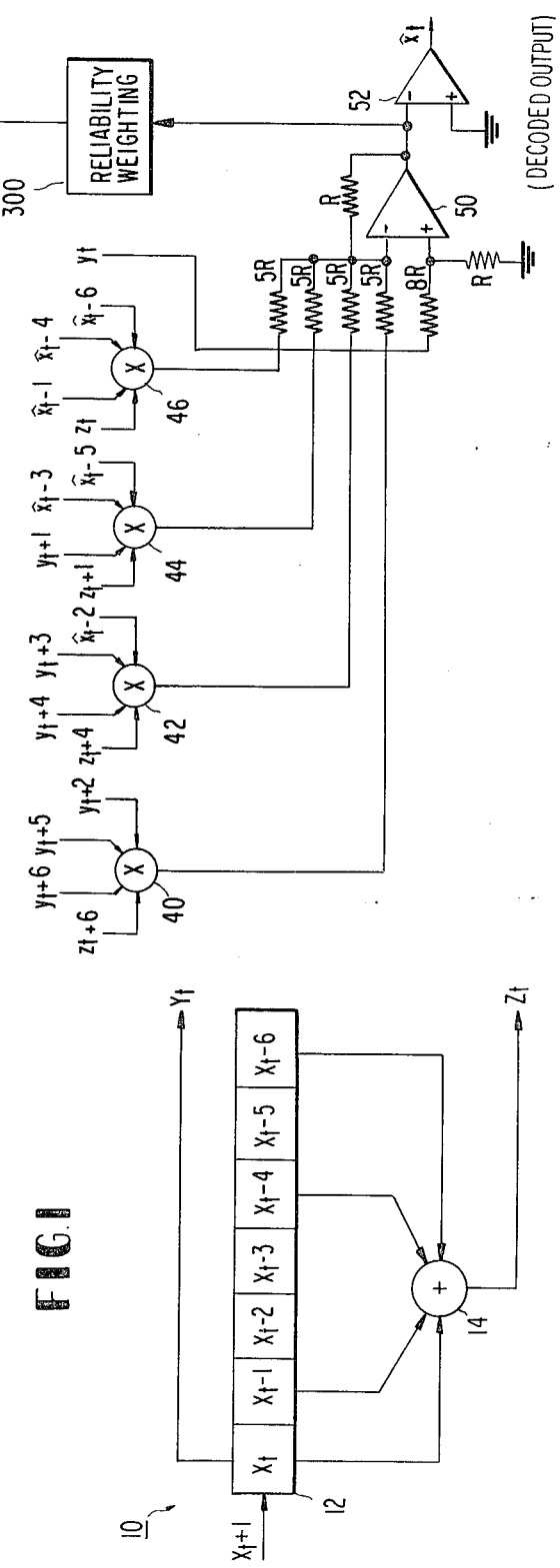

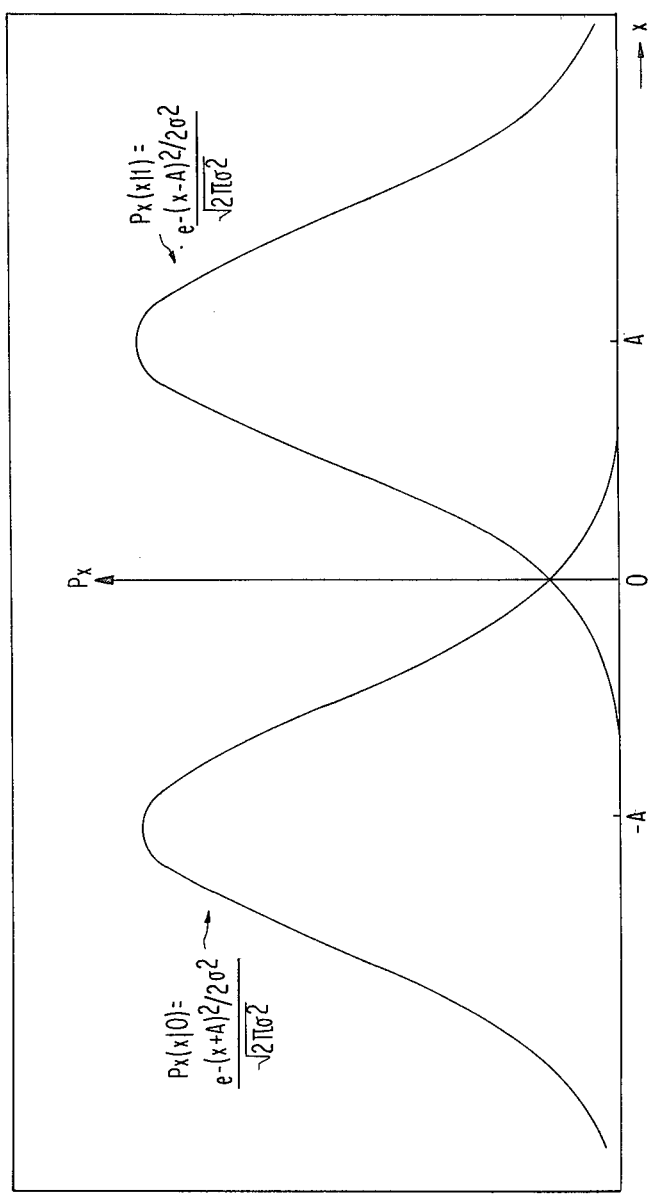

RELIABILITY-WEIGHTED ANALOG THRESHOLD DECODER

BACKGROUND OF THE INVENTION

This invention is related to the field of error-correction decoders, and more particularly to such decoders known as threshold decoders.

Coded data transmissions have conventionally been decoded by a number of techniques, most of which rely upon digital methods and algorithms for their implementation. One very practical type of decoding is known as threshold decoding, and threshold decoding techniques have been classified into Type I and Type II. In Type I, the parity sequences are recalculated from the received information bits and the recalculated parity bits are compared with the received parity bits with the results of the comparisons being stored in a syndrome register. Thus, the syndrome register will contain a plurality of indications representing agreement or disagreement between the received and recalculated parity bits. Appropriate stages in the syndrome register are polled and a decision is then made to either complement the received information bit or let it stand as is.

In the Type II decoder, the parity sequences are not recalculated, but the received information and parity bits are stored in a register. Appropriate combinations of the received information and parity bits are used to obtain a plurality of independent estimates of each received bit, and a decision as to the value of that bit is made based upon a polling of these plural estimates.

In most cases, threshold decoding techniques have been digitally implemented using hard detection. In hard detection, the received bit is assigned either a "0" or "1" binary value based upon whether it is above or below a predetermined threshold level. For example, in binary antipodal signalling employing voltage levels of +1 and −1 volts, a 0-volt threshold level would be used to determine the value of each received bit. A disadvantage of digital decoding techniques utilizing hard detection is that there is useful decoding information in the level of the received signal which is lost after the hard detection is performed. For example, a received voltage level of +1 volts would almost assuredly represent a transmitted +1 volt signal, but a received voltage level of 30 0.2 volts is much more questionable, but both would be decoded as the same value. In codes which are majority logic decodable, i.e. codes utilizing parity bits calculated from some combination of the information bits such that the received information bits can be decoded by polling either a plurality of independent estimates of the bit value itself or a plurality of independent estimates of the accuracy of the received bit value, significant coding gains could be achieved by weighting the various estimates in accordance with the reliabilities of the terms used to arrive at those estimates. In general, for example, a bit estimate obtained by a combination of various received bits each of which had a voltage level of approximately +1.0 volts would be much more reliable than an estimate obtained from a plurality of bits each having voltage levels of approximately +0.2 volts.

Some decoding techniques have been proposed in which soft detection is used to assign reliability weights to the various received bits. For example, approximate a posteriori probability (APP) decoding techniques employ 3-bit soft decisions. Conventional hard-decision threshold decoding is performed and the soft decision is utilized to weight either the conventional parity checks or the decoding threshold value. The use of soft decisions to reliability weight a digital decoding process, however, is somewhat difficult due to the necessity of maintaining a separate calculation loop solely for the reliability factors.

Recognizing the inherent reliability information in the analog values of the received bits, I previously devised an analog threshold decoding system which utilizes analog shift registers, analog multipliers and analog summation in generating the estimates of the received information bits. Such a system is disclosed in my U.S. Pat. No. 4,130,818, assigned to the same assignee as the present invention. The analog threshold decoding technique achieves improvements in coding gain since it utilizes the reliability information which is inherent in the analog received voltages. However, although the analog threshold decoding does make use of this inherent reliability information, it does not utilize this information in an optimal manner.

SUMMARY OF THE INVENTION

It is an object of this invention to provide an improved analog threshold decoding technique which makes better use of the reliability information in the received voltage levels.

Briefly, the improvement according to the present invention resides in the non-linear processing of the input and feedback data to convert the analog voltage levels into voltages which more accurately reflect the reliability of the bits. Analog threshold decoding is then performed utilizing the reliability weighted input voltages. In the feedback path, a somewhat different reliability weighting function is used due to the generally higher reliabilities of the decoded bits. Examples of the input weighting function are $\tanh(vA/\sigma^2)$, $\tanh(1.6v/a)$ or a linear transformation of the input voltage level with clamps at the upper and lower signalling voltages. Examples of the feedback weighting function are the use of a linear transformation having a gain of n times the gain of the input weighting function (where n is the number of output estimates) with clamps at the positive and negative signalling voltages, or hard decision feedback based on the decoded value of each bit.

BRIEF DESCRIPTION OF THE DRAWINGS

The invention will be more clearly understood from the following description in conjunction with the accompanying drawings in which:

FIG. 1 is a brief block diagram of an encoder for generating a majority-logic-decodable code;

FIG. 2 illustrates a reliability-weighted analog threshold Type II decoder according to the present invention;

FIG. 3 is a graph illustrating conditional probability density functions for bipolar signalling and Gaussian noise;

DETAILED DESCRIPTION OF THE PREFERRED EMBODIMENT

Referring first to FIG. 1, there is illustrated a rate one-half encoder, i.e., for every one information bit $X_t$ there are two transmitted bits consisting of the information bit $Y_t$ and a parity bit $Z_t$. The parity bit constitutes the exclusive OR sum of the first, second, fifth and seventh stages of shift register 12 and, therefore, the code generating polynomial is represented by $G = 1100101$.

Figure 6:
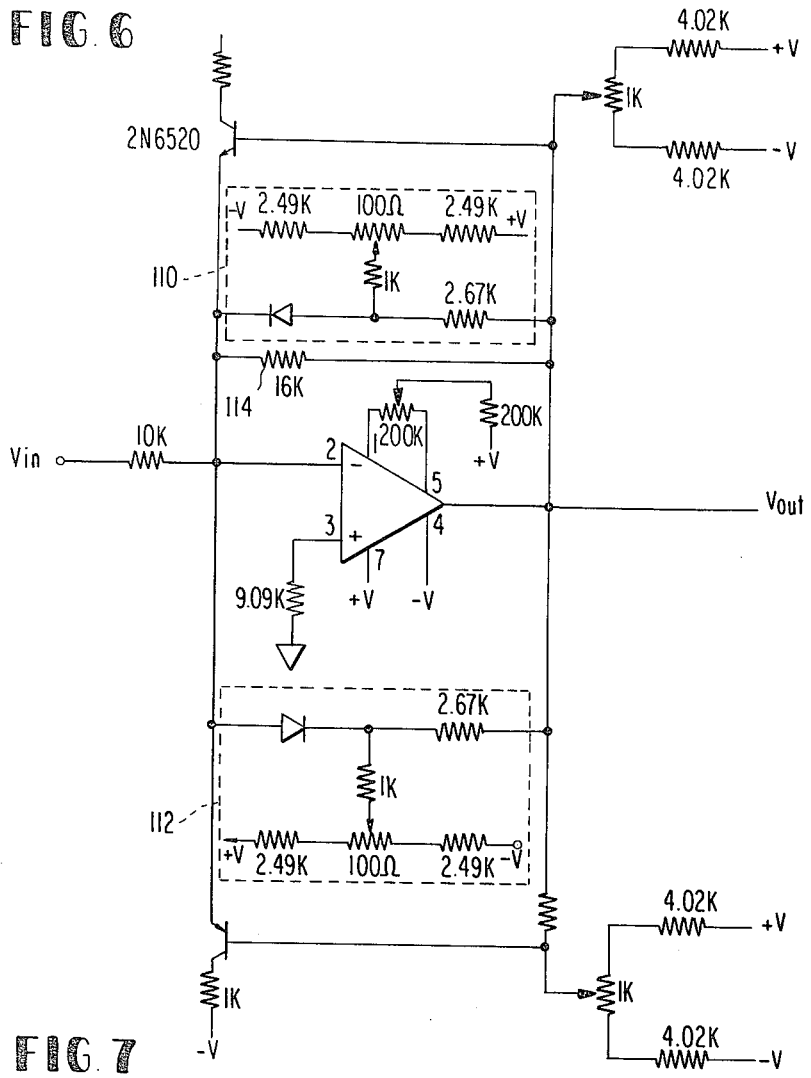
FIG. 6 is a schematic diagram of one example of an input weighting function generator.

FIG. 2 is a Type II analog threshold decoder according to the present invention and is largely a reproduction of FIG. 6 from my above-referenced U.S. Pat. No. 4,130,818, which said patent is incorporated herein by reference, and a complete description of the basic operation of the analog threshold decoder can be had by referring to said patent. However, the following is a brief description thereof.

Referring back to the encoder of FIG. 1, it will be seen that as each information bit $X_t$ progresses through the seven-stage shift register 12, seven parity bits will be calculated in the exclusive-OR operator 14. These parity bits can be expressed by the following equations:

$$Z_t = X_t + X_{t-1} + X_{t-4} + X_{t-6}$$

$$Z_{t+1} = X_{t+1} + X_t + X_{t-3} + X_{t-5}$$

$$Z_{t+2} = X_{t+2} + X_{t+1} + X_{t-2} + X_{t-4}$$

$$Z_{t+3} = X_{t+3} + X_{t+2} + X_{t-1} + X_{t-3}$$

$$Z_{t+4} = X_{t+4} + X_{t+3} + X_t + X_{t-2}$$

$$Z_{t+5} = X_{t+5} + X_{t+4} + X_{t+1} + X_{t-1}$$

$$Z_{t+6} = X_{t+6} + X_{t+5} + X_{t+2} + X_t$$

In FIG. 1, it is noted that the taps providing inputs to the modulo-2 adder 14 are taken from the first, second, fifth and seventh stages of the shift register 12. Accordingly, the first, second, fifth and seventh of the above equations include the term $X_t$. Since "+" in each of the above equations signifies modulo-2 addition, the equations containing the term $X_t$ can be rewritten as:

$$X_t = Z_t + X_{t-1} + X_{t-4} + X_{t-6}$$

$$X_t = Z_{t+1} + X_{t+1} + X_{t-3} + X_{t-5}$$

$$X_t = Z_{t+4} + X_{t+4} + X_{t+3} + X_{t-2}$$

$$X_t = Z_{t+6} + X_{t+6} + X_{t+5} + X_{t+2}$$

In a Type II threshold decoder as shown in FIG. 2, the received analog information and parity bits $Y_t$ and $Z_t$ are supplied to shift registers 20 and 30, respectively, and previously decoded output bits are supplied to register 60 for feedback purposes. Modulo-2 adders are provided to calculate these four different estimates of $X_t$. In the analog threshold decoder these calculations are performed by analog multipliers 40, 42, 44 and 46, with multiplier 40 performing the fourth calculation, multiplier 42 performing the third calculation, multiplier 44 performing the second calculation and multiplier 46 performing the first calculation. An additional estimate of $X_t$ is obtained from the transmitted value $Y_t$ itself. The various estimates are combined in a summation amplifier 50 and a threshold comparator 52 provides a decoded output $X_t$ based upon the output of the summation amplifier 50. For a more complete description of the operation of the analog threshold decoder reference is made to U.S. Pat. No. 4,130,818.

In the analog threshold decoder according to the present invention, reliability-weighting is performed on the received information bits, received parity bits and feedback estimates, and this weighting is performed by weighting function generators 100, 200 and 300, respectively. As described above, the analog multipliers are the approximate equivalents of the modulo-2 adders in a digital decoding technique, and the use of reliability weighting in the analog threshold decoding technique according to the present invention is based upon the realization that the reliability of an exclusive-OR product is given exactly by the product of the reliabilities of the terms used in obtaining the exclusive-OR product. This will be explained in more detail below.

In general, the received analog voltages are provided as inputs to a reliability weighting function generator 100 and a suitable non-linear transformation is performed such that the output of the weighting function generator will be a voltage proportional to the reliability of the received voltage. The same process is performed by the reliability weighting function generator 200 in response to the received voltage levels corresponding to the parity bits.

The objective in utilizing soft decisions is to employ the probability information contained in the received signal in such a way that received bits which are more reliable have greater influence during the decoding process. Thus, each input bit is to be weighted according to its reliability. An appropriate weighting function is derived by first expressing the a posteriori probability of correctly determining whether a bit is a 1 or a 0, given that a voltage v is received. A suitable mapping from probability to reliability is then accomplished.

For equiprobable 1s and 0s, the probability function varies from a value of $\frac{1}{2}$ to unity. When the probability is $\frac{1}{2}$, the received bit is totally unreliable (i.e., the toss of a coin might just as well be used instead of the received signal to determine whether a 1 or a 0 was transmitted). As the probability approaches one, however, the received bit tends toward total reliability. Thus, reliability may be considered to extend from zero to unity as probability ranges from $\frac{1}{2}$ to 1. Such a reliability function may be obtained from the probability expression by subtracting one-half (to zero-base the function) and multiplying by two, resulting in $$R = 2(Q - 0.5) \tag{1}$$

where

Q = probability of a correct decision conditioned on a received voltage v and

R = reliability of the decision.

A reliability function defined in this way possesses the property that the reliability of a modulo-two sum of several terms is given simply (and exactly) by the product of the individual term reliabilities. This is important for threshold decoding because each output estimate or parity check in a conventional hard-decision threshold decoder is the modulo-two sum (i.e., exclusive-OR) of several terms. Each such sum will be correct if its constituents are either all correct or contain an even number of errors.

Thus, for the case of two binary variables having individual probabilities $Q_1$, $Q_2$ of being correct, and individual probabilities $P_1$, $P_2$ of being incorrect, the probability $Q$ that the estimate formed by their modulo-two sum is correct is $$Q = Q_1Q_2 + P_1P_2$$
$$= Q_1Q_2 + (1 - Q_1)(1 - Q_2)$$
$$= 2Q_1Q_2 - Q_1 - Q_2 + 1$$

The reliability $R$ of the estimate is then given by equation (1) as $$R = 2Q - 1$$

or $$R = 4Q_1Q_2 - 2Q_1 - 2Q_2 + 1 \qquad (2)$$

Equation (2) was obtained by first determining the probability of a correct estimate and then converting from probability to reliability. The assertion that this same result may be obtained by merely multiplying the individual reliabilities $R_1$, $R_2$ may be verified by writing $$R_1R_2 = (2Q_1 - 1)(2Q_2 - 1) \qquad (3)$$
$$= 4Q_1Q_2 - 2Q_1 - 2Q_2 + 1$$

Thus, the reliability of a modulo-two sum of two variables is the product of the two reliabilites. Since a modulo-two sum of three or more variables may be built up from two-term summations, the reliability of a modulo-two summation of any number of terms is given by the product of their individual reliabilities. This useful property does not depend upon the reliability function having any specific form, but only upon the relationship between probability and reliability being defined by equation (1). The reliability of a modulo-two summation is thus primarily determined by the reliability of the least reliable term, and is further diminished by the degree of unreliability of the other terms.

It will be desirable to incorporate polarity information into the reliability function so that a single quantity may be used to express a reliability-weighted input bit. This polarity will represent the receiver's decision as to whether a 1 or a 0 has been transmitted and the magnitude will represent the reliability of that decision. Consequently, the voltage-to-reliability mapping for a received 0 will utilize a function that varies from zero to minus one, while that for a received 1 will range from zero to plus one.

As mentioned previously an appropriate transformation from received voltage to reliability may be developed by first expressing the a posteriori probability of correctly determining whether a bit is a 1 or a 0, given that a voltage $v$ is received. A suitable mapping from probability to reliability may then be accomplished by means of equation 1.

The probability of a correct decision at the receiver, given a certain received voltage, may be obtained through use of the mixed form of Bayes Rule $$P[C|x = b] = \frac{P[C]p_x(b|C)}{p_x(b)} \qquad (4)$$

where the upper-case $P$ denotes probability and the lower-case $p$ denotes a probability density function. In addition, the upper case $C$ indicates an event while the lower case $b$ represents a specific value of the random variable $x$. Therefore, $$p_x(b) = p_x(x)|_{x=b}$$

and $$p_x(b|C) = p_x(x|C)|_{x=b}$$

Without loss of generality, we may consider the case of a received positive voltage exceeding the decision level for discriminating between a 1 and a 0 such that the receiver will decide that a 1 has been transmitted. Since it is given that the receiver will treat the received quantity as a 1, the problem reduces to determining the probability that a 1 was transmitted, given that a positive voltage $v$ was received. The left side of equation (4) should be interpreted in just such a manner. The numerator on the right side of equation (4) should then be interpreted as the probability of a 1 being transmitted multiplied by the density function of $x$ conditioned on a 1 being transmitted and evaluated at the point $x=v$. The denominator then becomes the density function of $x$ (without conditioning) evaluated at $x=v$.

Thus, for positive received voltages above the normal hard-detection threshold, equation (4) may be rewritten as $$P[1|v] = \frac{P[1]\,p_x(x|1)|_{x=v}}{p_x(x)|_{x=v}} \qquad (5)$$

where, for convenience, $P[1|v]$ is written instead of the more explicit $P[1|x=v]$.

The denominator may be written in terms of the conditional density functions by noting that $$p(v) = p(v|1)P[1] + p(v|O)P[O].$$

Thus, the denominator of equation (5) may be written as $$p_x(x)|_{x=v} = P[1]p_x(x|1)|_{x=v} + P[O]p_x(x|O)|_{x=v} \qquad (6)$$

Equation (5) is valid for all values of $v$ above the 1/0 hard decision level, independent of the form of the density functions or the a priori probabilities $P[1]$ and $P[O]$. In order to determine a specific reliability function, it is necessary to evaluate equation (5) for a particular case of interest, namely bipolar signaling ($\pm A$ volts) with equiprobable 1s and 0s in additive Gaussian noise as shown in FIG. 3. In this case $$P[1] = P[O] = \tfrac{1}{2}$$

Since the decision level now becomes zero volts, the probability of making a correct decision is given by equations (5) and (6) for any positive received voltage. Specifically, the probability that a 1 was transmitted, given a received positive voltage $v$, becomes $$P[1|v] = \frac{(\frac{1}{2}) \frac{e^{-(v-A)^2/2\sigma^2}}{\sqrt{2\pi\sigma^2}}}{\frac{1}{2} \left[ \frac{e^{-(v-A)^2/2\sigma^2}}{\sqrt{2\pi\sigma^2}} + \frac{e^{-(v+A)^2/2\sigma^2}}{\sqrt{2\pi\sigma^2}} \right]} \quad (7)$$

or $$P[1|v] = \frac{1}{1 + e^{-2vA/\sigma^2}}$$

A reliability function varying from zero to unity as probability varies from $\frac{1}{2}$ to 1 may be obtained from the probability expression of equation (7) by writing $$R[1|v] = 2(P[1|v] - 0.5) \quad (8)$$

$$R[1|v] = \frac{1 - e^{-2vA/\sigma^2}}{1 + e^{-2vA/\sigma^2}} \quad v \geq 0 \quad (9)$$

In a similar manner, it may be shown that the reliability function for negative received signals, under the same assumptions of binary signaling in Gaussian noise, becomes $$R[0|v] = \frac{1 - e^{-2vA/\sigma^2}}{1 + e^{-2vA/\sigma^2}} \quad v \leq 0 \quad (10)$$

The fact that equations (9) and (10) yield identical results shows that a single reliability function may be employed for both positive and negative received signals. The reliability of a received bit r, given a demodulator output of v volts, is given by $$R[r|v] = \frac{1 - e^{-2vA/\sigma^2}}{1 + e^{-2vA/\sigma^2}} = \frac{e^{vA/\sigma^2} - e^{-vA/\sigma^2}}{e^{vA/\sigma^2} + e^{-vA/\sigma^2}} \quad (11)$$

or $$R[r|v] = \tanh \frac{vA}{\sigma^2}$$

for any polarity of v. This reliability function applies specifically to the case of binary signaling with equiprobable ones and zeros in additive Gaussian noise.

It is evident from equation (11) that the reliability of a received bit is not only a function of received signal level v, but also of signal-to-noise ratio. In an actual decoder, a single compromise reliability function would ordinarily be implemented, since it would generally be impractical to vary the reliability weighting with changes in signal-to-noise ratio. In addition, an approximation of equation (11) may generally be desired, rather than an exact implementation.

T. Hwang, "Analog Algebraic Decoding of Linear Block Codes," Ph.D thesis, Syracuse University, December 1977 has suggested a sinusoidal reliability weighting for certain block codes which, when transformed for bipolar signalling, becomes $$R[r|v] = \begin{cases} 1 & v > A \\ \sin \frac{\pi v}{2A} & -A \leq v \leq A \\ -1 & v < -A \end{cases} \quad (12)$$

Figure 4:
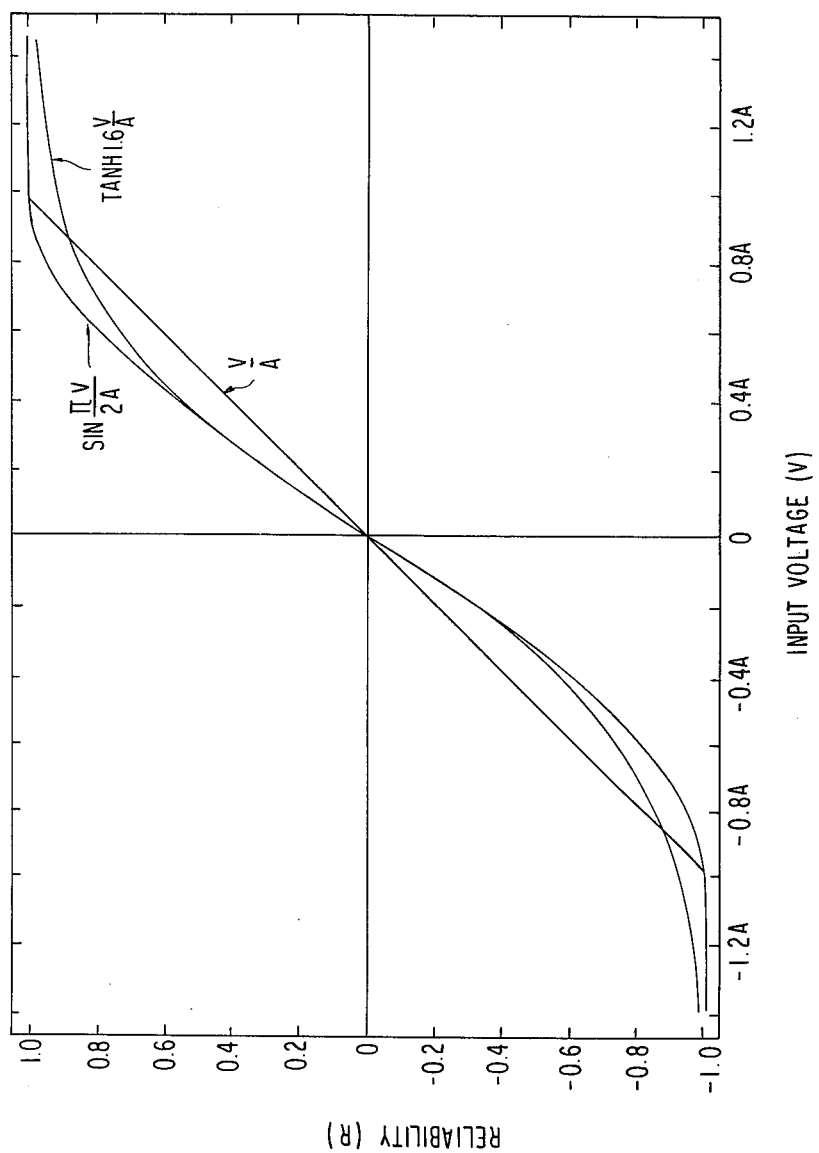
FIG. 4 is a graphical illustration of several examples of input reliability weighting functions.

This function, as shown in FIG. 4, is somewhat similar to, and possesses the same slope at low amplitudes as, a version of equation (11) given by $$R[r|v] = \tanh 1.6 \frac{v}{A} \quad (13)$$

Further, as will be explained in more detail below, virtually identical performance is reported using equation (13) and a straight-line approximation given by $$R[r|v] = \begin{cases} 1 & v > A \\ \frac{v}{A} & -A \leq v \leq A \\ -1 & v < -A \end{cases} \quad (14)$$

In the analog threshold decoding technique without reliability weighting, the amplitude of the received analog voltage is considered as a direct indication of the reliability of the received bit. While this may be acceptable in the range between the binary signalling voltages of $\pm A$ volts, it does not hold true outside of that range. For instance, a received voltage level of 0.4 volts would be approximately half as reliable as a received voltage level of 0.8 volts, but a received voltage level of 1.4 volts is not twice as reliable as a received voltage level of 0.7 volts. Misleading reliability calculations are eliminated according to each of equations (11)-(14) by assigning a fixed maximum reliability to any voltage level exceeding a predetermined threshold level. In the equation (14), all voltages exceeding the positive signalling voltage A are assigned a maximum reliability of 1, while all voltages exceeding the negative signalling voltage of $-A$ are assigned a maximum negative reliability of $-1$. The intervening voltage levels are allowed to pass unchanged through the reliability weighting function generators 100 and 200.

A stability problem may be encountered in the decoder if no reliability weighting is provided in the feedback loop. By providing a reliability weighting function generator 300 at the output of summation amplifier 50, it can be ensured that the previously-decoded output values stored in the feedback register 60 will be properly weighted when fed back into the multipliers.

The appropriate reliability weighting in the feedback loop is different from that at the decoder input because the summing amplifier's output represents the sum of n independent variables (where n=5 in this example). Thus, its mean and variance would be the sums of the input means and variances, respectively. It will be observed that in FIG. 2 the summing amplifier input from multiplier 40 is composed of the product of four received bits, while another from multiplier 46 involves only one received bit and three previously-decoded (hence, presumably higher-reliability) bits, and still another is obtained solely from one received bit $Y_t$. Thus, the mean and variance of each input is different.

These differences would be important if one were interested in expressing the a priori probability of a crorect decision at the output of the summing amplifier.

Instead, it is the reliability of a particular decision that is sought and, hence, it is the posteriori probability, i.e., the probability of a correct decision given certain received voltages, which is of interest. In determining a posteriori probability, an input voltage to the summing amplifier of, e.g., 0.7 volt always has the same reliability no matter whether one or many variables enter into it. The voltage at the output of any multiplier is precisely the reliability of that signal. Thus, each input to the summing amplifier must be equally weighted.

Summation could be accomplished with each input subjected to unity gain or, if normalized as in FIG. 2, by compensating the individual gains of 1/5 by following the adder with a stage having a gain of 5. The resulting summing amplifier output voltage would then undergo reliability weighting using the same reliability transformation as at the decoder input.

Since the clamped unity-gain weighting of equation (14) is a very good approximation at the decoder input, the summing amplifier of FIG. 2 need only be followed by a gain of five and a ±1 volt clamp. Indeed, experimental results show that the lowest bit error rate (BER) is obtained with a feedback gain of five, while performance degrades for both higher and lower gains. The gain is the slope of the linear transformation determined by the coefficient of v/A in Equation (14), i.e., for a gain of two the transformation in the linear region would be (2 v/A)

The degradation is slight, however, as the feedback gain is increased toward infinity with ±1 volt clamping, resulting in hard-decision feedback. This is equivalent to assigning a maximum reliability weighting to each decoded bit estimate feed back. Considerable circuit simplification is possible in this case as the feedback register may simply be a conventional digital shift register which directly accepts the decoded output. Moreover, multiplication of hard-decision values may be replaced by exclusive-OR operations, while multiplication of a soft variable by a hard one is merely a programmable inversion of the soft signal, depending upon the binary value of the hard-decision quantity.

Preliminary hardware results showed that hard-decision feedback (i.e. infinite gain with ±1-volt clamping) degraded performance by less than 0.2 dB compared to optimum gain-of-five feedback weighting, but the decoding performance decreased significantly when the feedback gain was less than unity. Since hard-decision feedback is much simpler to implement, it was employed for all subsequent hardware testing and only the input reliability weighting function was varied.

Figure 5:
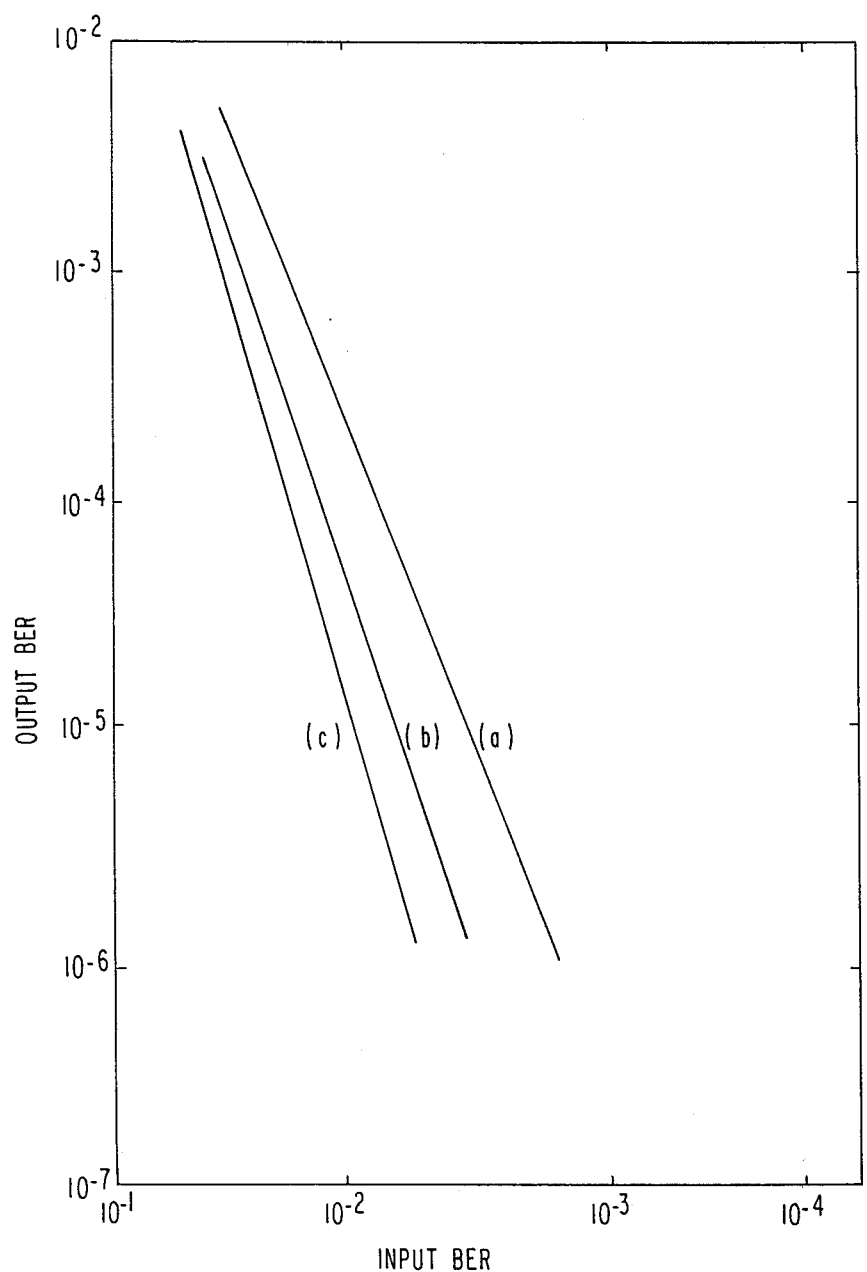
FIG. 5 is a graphical illustration of the performance improvements realized by the decoding technique according to the present invention.

Unity gain input reliability with voltage clamps according to equation (14) and input reliability weighting according to equation (13) resulted in substantially identical decoding performance as illustrated in curve (c) of FIG. 5. Unity gain input reliability weighting without clamps (corresponding substantially to the absence of any input reliability weighting function whatsoever) resulted in degraded performance shown by curve (b) in FIG. 5. Conventional hard-detection decoding performance is illustrated by curve (a) in FIG. 5. The results illustrated in FIG. 5 collectively indicate the significance of the upper and lower voltage clamps while also indicating the relative insensitivity of the decoding performance to the exact shape of the input transfer function. As long as the desired non-linearity is approximately by simple clamping, the exact function at values between the clamping voltages is variable. Tests have shown, however, that if a linear transformation is used, the gain of the reliability weighting function should be between 0.5 and 2.0, with optimal results being achieved with a gain of 1.0.

FIG. 6 is a schematic diagram of one example of circuitry used to implement reliability weighting according to equation 13. To modify the circuitry of FIG. 6 to achieve unity gain transformation with ±1 volt clamps, it is a simple matter to merely remove the circuit components generally designated by reference numerals 110 and 112, and to change the value of resistor 114 from 16 K ohms to 10 K ohms.

Figure 7:
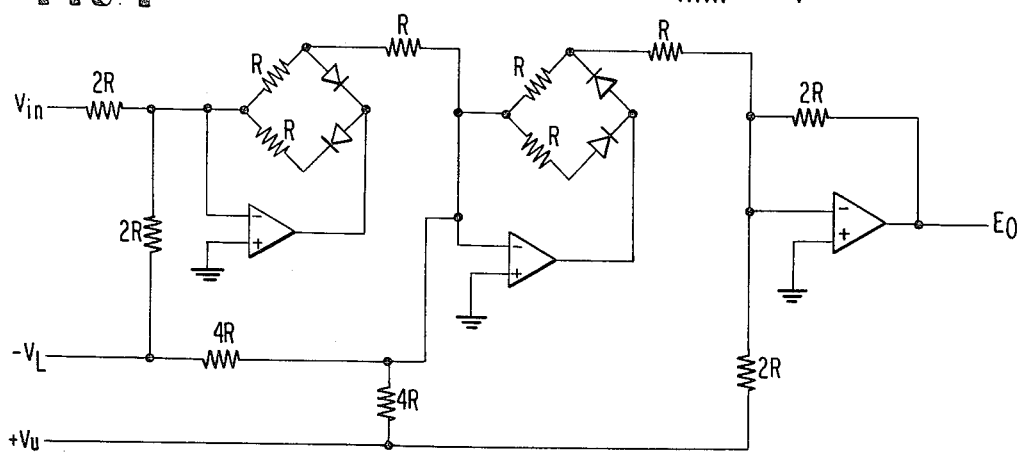
FIG. 7 is a schematic diagram of a second example of an input weighting function generator.

FIG. 7 is a further example of circuitry which could be used to achieve unity gain with positive and negative voltage clamps.

While the invention has been described in conjunction with the decoding of a convolutional code, it should be appreciated that the invention will be applicable wherever a decoded output is conventionally formed by the modulo-2 addition of hard-decision variables i.e., wherever the reliability of a hard-decision result may be expressed as the product of individual term reliabilities. Thus, it would be applicable to certain block codes, particularly those which are majority logic decodable. Also, it should be noted that the invention is not limited to use only in Type II decoders.

What is claimed is:

1. In an analog threshold decoder for decoding majority logic decodable codes having input and parity bit sequences, said decoder having multi-stage analog storage means having at least one input for storing analog voltages supplied to said input, and summation means for providing an analog output derived from the selective combination of a plurality of said stored analog voltages, the improvement comprising:

input non-linear reliability weighting means for receiving analog voltages representing bit values in said information and parity bit sequences and, for each received analog voltage, providing to the input of said analog storage means a voltage which is a non-linear function of said received analog voltage and represents both the polarity and reliability of the bit value represented by said received analog voltage.

2. An analog threshold decoder as defined in claim 1, wherein said received analog voltages include information analog voltages corresponding to information bits in said code and parity analog voltages representing parity bits in said code, said input non-linear reliability weighting means including information bit non-linear reliability weighting means and parity bit non-linear reliability weighting means, both of which utilize the same non-linear function.

3. An analog threshold decoder as defined in claim 1, wherein said code employs signalling voltages of +A and −A volts transmitted over a transmission channel having additive Gaussian noise, said non-linear function being defined by:

$$R = tanh(vA/\sigma^2),$$

where v is the received analog voltage level, $\sigma^2$ is the variance of Gaussian noise in said transmission channel and R is said input reliability voltage.

4. An analog threshold decoder as defined in claim 1, wherein said code employs signalling voltages of ±A volts and said non-linear function is defined by:

$$R = tanh(1.6v/A),$$

where v is the received analog voltage level and R is said input reliability voltage.

5. An analog threshold decoder as defined in claim 1, wherein said code employs signalling voltages of ±A volts, and said non-linear function is defined by:

$$R[r|v] = \begin{cases} 1 & v > A/m \\ \dfrac{mv}{A} & \dfrac{-A}{m} \leq v \leq \dfrac{A}{m} \\ -1 & v < -A/m \end{cases}$$

where v is the received analog voltage level, R is the input reliability voltage, and m is a gain constant.

6. An analog threshold decoder as defined in claim 1, wherein said decoder includes feedback means for feeding back to said analog storage means a feedback voltage derived from the output of said summation means, the improvement further comprising:

feedback reliability weighting means for receiving the output of said summation means and providing a feedback voltage which is a non-linear function of said summation means output and represents both the polarity and reliability of a bit represented by said summation means output.

7. An analog threshold decoder as defined in claim 6, wherein said analog storage means includes feedback analog storage means for receiving and storing said feedback voltages.

8. An analog threshold decoder as defined in claim 6, wherein said feedback means comprises a threshold detector for providing a fixed feedback voltage if one polarity of said summation means output is positive and a fixed feedback voltage of the opposite polarity if the output of said summation means is negative.

9. An analog threshold decoder as defined in claim 6, wherein said code employs signalling voltages of ±A volts and said non-linear function employed by said feedback reliability weighting means is defined by:

$$R_f = \begin{cases} 1 & V_f > A/n \\ \dfrac{nV_f}{A} & -A/n \leq V_f \leq A/n \\ -1 & V_f < -A/n \end{cases}$$

where $V_f$ is the output of said summation means, $R_f$ is said feedback reliability voltage and n is a feedback gain constant greater than or equal to 1.

10. An analog threshold decoder as defined in claim 9, wherein the value said feedback gain constant n is 5.

11. An analog threshold decoder as defined in claim 5, wherein the value of said gain constant m is between 0.5 and 2.0.

12. An analog threshold decoder as defined in claim 11, wherein the value of said gain constant m is approximately 1.0.

13. An analog threshold decoder as defined in claim 5, wherein said summation means includes a plurality of analog multipliers each receiving a different set of inputs from said analog storage means and each providing an output representing the value of a particular bit in said code and a summation amplifier receiving and combining the outputs from said plurality of analog multipliers, the output of said summation amplifier representing the decoded value of said particular bit.

14. An analog threshold decoder as defined in claim 13, wherein said code employes signalling voltages of ±A volts and said non-linear function employed by said feedback reliability weighting means is defined by:

$$R_f = \begin{cases} 1 & V_f > A/n \\ \dfrac{nV_f}{A} & -A/n \leq V_f \leq A/n \\ -1 & V_f < -A/n \end{cases}$$

where $V_f$ is the output of said summation means, $R_f$ is said feedback reliability voltage and n is a constant equal to the number of analog multiplier outputs.

* * * * *

UNITED STATES PATENT AND TRADEMARK OFFICE
CERTIFICATE OF CORRECTION

PATENT NO. : 4,322,848
DATED : March 30, 1982
INVENTOR(S) : John S. Snyder, Jr.

It is certified that error appears in the above—identified patent and that said Letters Patent is hereby corrected as shown below:

Column 1, line 46 - delete "30" insert -- + --;

Column 2, line 38 - change "1.6v/a" to --1.6v/A--;

Column 3, line 45 - change "containg" to --containing--;

Column 7, line 35 - change "Ihe" to --The--;

Column 8, line 68 - change "crorect" to --correct--;

Column 9, lines 65-66 - change "approximately" to --approximated--.

Signed and Sealed this

Twelfth Day of October 1982

[SEAL]

Attest:

GERALD J. MOSSINGHOFF

*Attesting Officer*  *Commissioner of Patents and Trademarks*